Dec. 29, 1942.  W. A. RAY  2,306,904
FLUID CONTROL VALVE
Filed March 14, 1941   2 Sheets-Sheet 1
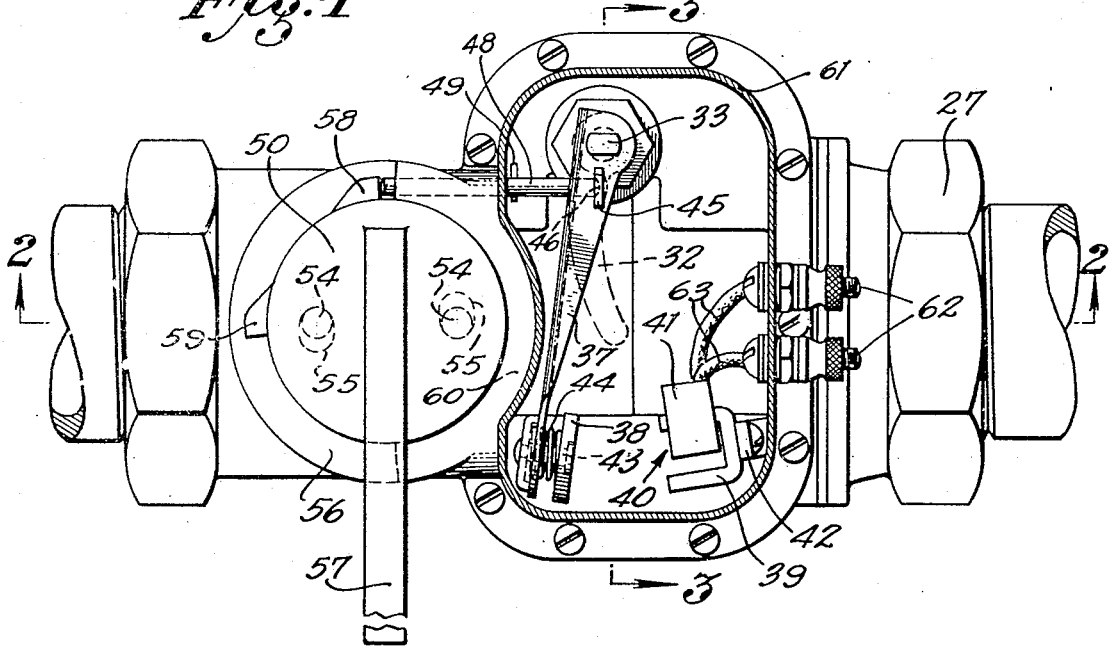
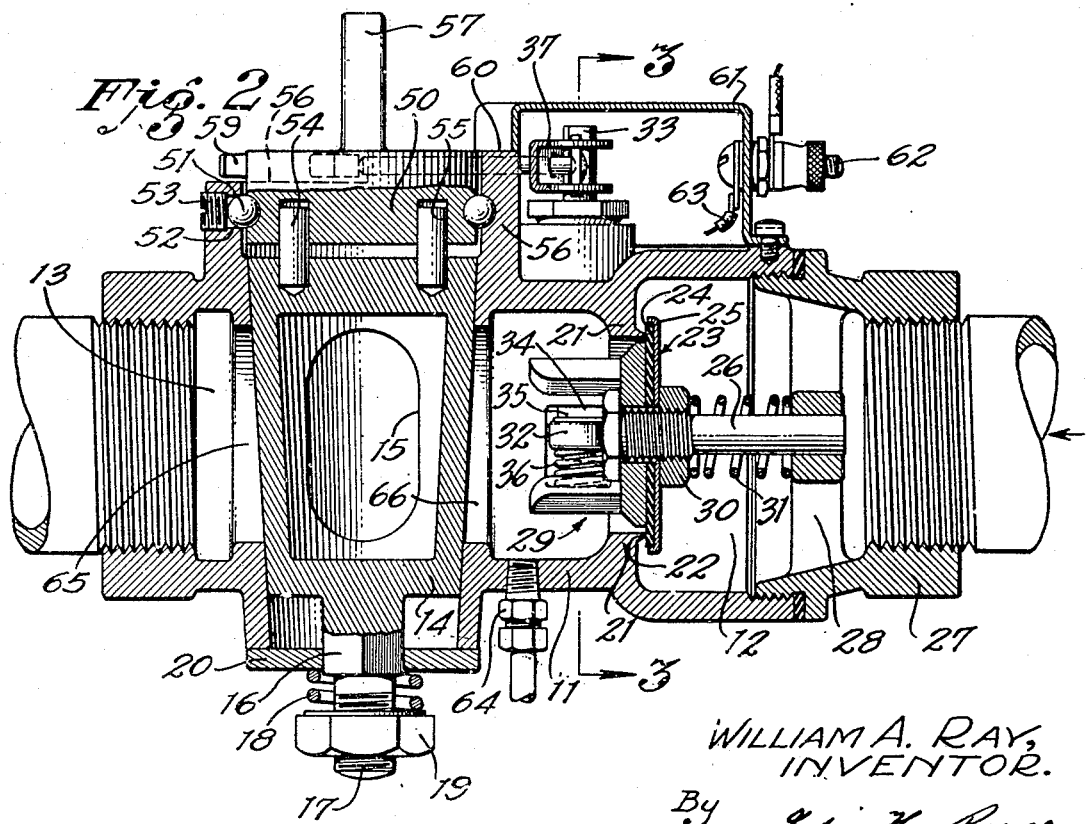
WILLIAM A. RAY,
INVENTOR.
By John H. Rouse,
ATTORNEY.

Dec. 29, 1942.     W. A. RAY     2,306,904
FLUID CONTROL VALVE
Filed March 14, 1941     2 Sheets-Sheet 2
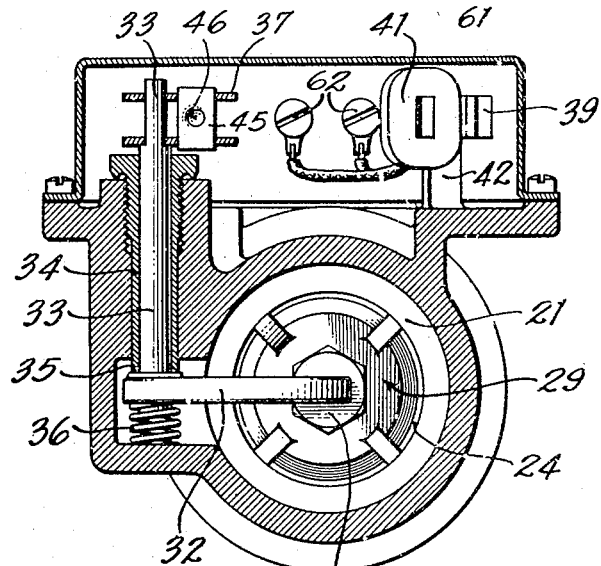
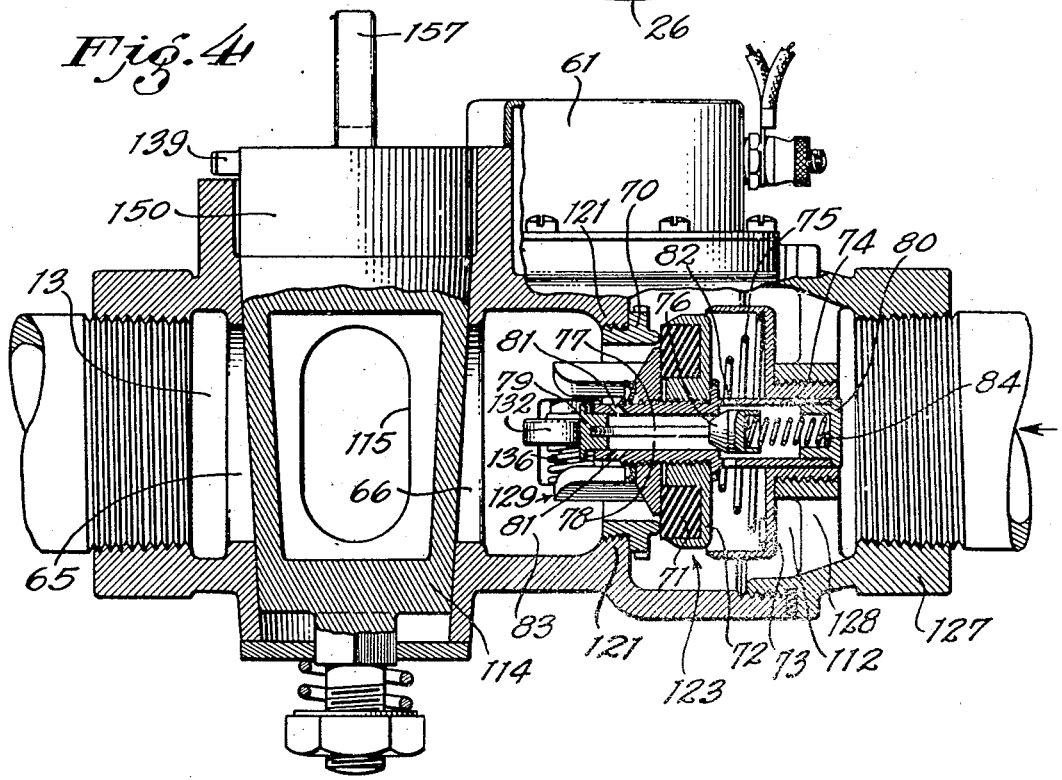
WILLIAM A. RAY,
INVENTOR.
By John H. Roose,
ATTORNEY.

Patented Dec. 29, 1942

2,306,904

UNITED STATES PATENT OFFICE 2,306,904

FLUID CONTROL VALVE

William A. Ray, Glendale, Calif.

Application March 14, 1941, Serial No. 383,323

4 Claims (Cl. 137—144)

My present invention relates to fluid control valves and particularly to those of the type wherein a manually operable plug valve is provided for normally controlling fluid passage through the valve, a safety valve additionally being provided whereby, upon failure of a controlling condition, fluid flow through the valve is obstructed.

A main object of my invention is to provide simple and effective means whereby the safety valve may be reset or restored to its open position by the rotation of the plug valve while maintaining the same closed.

Another object is to provide means whereby the safety valve may be fully opened by the rotation of the plug valve through an angle which is so small with respect to that through which it is moved between open and closed positions that the plug valve may have a relatively large passageway therethrough.

Another object is to provide a combination plug and safety valve wherein the various openings are substantially coaxial so that the fluid pressure loss in the valve is small.

Another object is to provide, in a valve of the character described, means for retaining the safety valve in open position, which means are arranged exteriorly of the valve casing and hence are not exposed to the fluid controlled by the valve.

Another object is to provide means for operating the plug valve and the safety valve, which means has limited freedom of rotation with respect to the plug valve so that the safety valve can close without causing rotation of the plug valve.

Other objects and advantages of my invention will be found in the description, the drawings and the appended claims.

For complete understanding of the invention, reference may be had to the following detailed description and accompanying drawings, wherein:

Figure 1 is a plan of a valve embodying my invention, the electromagnet housing 61 being broken away to show the interior parts;

Figure 2 is a longitudinal section taken along the line 2—2 of Fig. 1;

Figure 3 is a transverse section taken along the line 3—3 of Fig. 1; and

Figure 4 is a view, mainly in longitudinal section, of a modified form of valve embodying my invention.

Referring first to Figs. 1–3 of the drawings, the numeral 11 indicates a valve casing having an inlet 12 and an outlet 13. Rotatable in a valve socket formed in the outlet end of the casing is a hollow tapered valve plug 14 having a diametral opening 15 therethrough which, when the plug is in its open position, coincides with lateral openings 65 and 66 formed in the socket portion of the casing. The lower end of the plug is provided with a squared portion 16 and a threaded bottom portion 17. The plug is urged to its seat by a spring 18 compressed between a nut 19 threaded on the portion 17 and a washer 20, which washer has a squared central opening for receiving the plug portion 16, the upper surface of the washer bearing against the outer surface of the casing surrounding the plug socket.

Intermediate the plug valve and the inlet 12 is a ported partition 21 provided at its inlet end with a valve seat 22. Cooperable with this seat is a closure member generally indicated at 23, and comprising a disk 24 of resilient material backed by a metal washer 25. The closure member is carried on the threaded and headed inner end portion of a valve stem 26. For supporting the stem 26, a bushing 27 is provided. This bushing is threaded in the inlet of the casing and has a spider portion 28 which is centrally bored to receive the stem 26. The closure member is guided at its inner end by a crow's-foot 29 freely slidable in the port opening and secured to the stem 26 by a nut 30 with the members 24 and 25 therebetween. Around the stem 26 is a compression spring 31 which urges the closure member toward its seat.

An arm 32, one end of which is adapted to engage the head of stem 26, is provided for the actuation of closure member 23. This arm is secured at its other end to one end of a rod or stem 33 (Fig. 3) which extends exteriorly of the valve casing and is guided in an elongated bushing 34 threaded in a thickened portion of a wall of the casing. The inner or bottom end of the bushing is beveled to provide a knife-edge portion 35, against which the boss of arm 32 is forced by a compression spring 36 to provide a fluid-tight seal for the stem 33.

A portion of the upper outer end of stem 33 is milled to provide opposite flat sides for the mounting thereon of a channeled lever 37 which has openings closely conforming to the cross-section of this portion so that the lever is frictionally held when it is pressed on to the stem. Carried on the free end of this lever is an armature 38 of magnetic material which, when the lever is moved in counterclockwise direction from its position shown in Fig. 1, is adapted to engage the pole faces of a U-shaped core 39 of an electromagnet 40 which includes an energizing coil 41. The electromagnet is rigidly mounted on a lug 42 extending from the outer surface of the valve casing. So that the surfaces of the armature and of the pole faces can accurately align when they are brought into engagement, the armature is rockably mounted on the lever by a loosely fitting pin 43, against the head of which the armature is normally urged by a compression spring 44. Close to the pivoted end of the lever 37, the side portions of the same are slotted to receive a bridging strip 45 which, after assembly, is formed with a cup-shaped depression 46.

The portion 56 of the casing above and surrounding the valve plug socket is enlarged for the reception of a plug operating member 50. The adjacent side walls of this member and of the portion 56 are grooved to provide a race for ball bearings 51, the balls being introduced through a lateral opening 52 which is then closed by a screw plug 53. Operatively connecting the member 50 and the plug 14 is a pair of pins 54 which are tightly pressed into holes in the top surface of the plug and extend into enlarged openings 55 (Fig. 1) in the bottom of member 50, so that limited freedom of rotation between the operating member and the plug is permitted. Integral with the member 50 is an operating handle 57. Formed on the upper portion of the member 50 is a pair of dogs 58 and 59 which serve to limit rotation of this member to approximately 90° by their respective engagement with the opposite ends of a raised portion 60 of the portion 56.

Slidable in a bore formed in the portion 60 is a pin 48, the rounded right-hand end of which is adapted to engage the depression 46 in the lever bridging strip 45. The other end of pin 48 normally extends slightly outward from the edge of portion 60 and is engageable by the dog 58 when the member 50 is rotated in clockwise direction. A cotter pin 49 limits outward movement of the pin.

Secured by screws to the outer surface of the casing is a housing 61 which encloses the lever and electromagnet parts, terminals 62 insulatingly mounted in the side wall of the housing being provided for connection of the electromagnet coil leads 63.

If the member 50 is rotated in a clockwise direction from the position shown, the engagement of dog 58 with the end of rod 48 moves the same in a right-hand direction, thereby swinging the lever 37 so that when the dog 58 is in its limited position against the edge of portion 60, the armature 38 is in engagement with the pole faces of core 39, armature spring 44 being partly compressed. Simultaneously, by this movement, the arm 32 forces closure member 23 away from its seat against the force of spring 31. If, the electromagnet 40 being unenergized, the member 50 is now released, the parts reassume the positions shown in the figures, the force of spring 31, acting through the leverage provided by arm 32, being sufficient to return the parts against the friction produced by the sealing means 35 provided for stem 33. The member 50 offers but little resistance to the return of pin 48 on account of its ball-bearing mounting; and, on account of the freedom of movement of the plug pins 54 in member 50 provided by the elongated openings 55, the plug 14 remains stationary during the above-mentioned movements of member 50. It will be seen that, by arranging the pin 48 to engage the lever 37 close to its pivot, a small angular movement (approximately 6° in the example shown) of the member 50 is sufficient to effect full opening of the closure member 23. If the electromagnet 40 is energized when the armature 38 is brought into engagement with core 39, the armature is magnetically held, thereby preventing return of the parts under the bias of spring 31.

In describing the operation of the valve shown in Figs. 1-3, it will be assumed that the inlet bushing 27 of the valve is connected to a source of gaseous fuel, that the valve outlet 13 is connected to a main burner, that a pilot burner for the main burner is connected to the valve casing intermediate the plug valve and the closure member 23 as by a fitting 64, and that a thermoelectric device for supplying current to the coil of electromagnet 40 is arranged to be heated by the flame of the pilot burner.

With the parts in the positions shown in the figures, fuel supply to the main burner is obstructed by both the closure member 23 and the plug 14, supply to the pilot burner being obstructed only by the closure member 23. To initiate operation of the burner system, the member 50 is rotated by its handle 57 in a clockwise direction so that, as was described above, the closure member 23 is opened and the armature 38 brought into engagement with core 39. While holding the member 50 in this position, the gas now flowing to the pilot burner past the open closure member 23 is lighted. After the thermoelectric device has been heated for a short space of time, sufficient energy will be generated thereby to cause the electromagnet to hold the armature, whereupon the operating handle may be released, the closure member 23 remaining in its open position, as was described above.

If it is now desired to supply fuel to the main burner, the operating handle 57 is turned through approximately 90° in counterclockwise direction until dog 59 on member 50 engages the edge of portion 60. By this movement, the plug 14 is turned to its full-open position by the connecting pins 54. To extinguish the main burner, the plug is returned to its previous position. If, while the plug 14 and the closure member 23 are both in open position supplying fuel to the main and pilot burners, the pilot burner flame should accidentally be extinguished, upon the resultant cooling of the thermoelectric device the electromagnet will be deenergized, releasing the armature and permitting the closure member 23 to return to its seat under the bias of spring 31, thereby obstructing fuel supply to both burners. To reinitiate operation of the burner system, the "safety valve" (closure member 23) must be "reset." To do this, the valve plug 14 must first be returned to its closed position before closure member 23 can be reopened. It is therefore clear that, unless the pilot burner is alight, it is impossible to supply fuel to the main burner by manipulation of the plug valve.

While, by way of example, the operation of the valve of my invention has been described in connection with the control of a gas burner system, it is obvious that the valve is also useful for other purposes. The condition responsive safety valve holding means are arranged remote from the valve chambers so that these means are unaffected by the fluid controlled, and for that reason the valve may, for example, be employed in chemical processes for controlling fluids which would harmfully affect the electromagnet or other safety valve holding means. While in some instances the "pilot" connection between the plug and safety valves may be omitted, the arrangement shown is useful in various processes wherein it is desired to provide a continuous restricted supply of fluid in addition to selective full-supply control, both supplies being shut off in the event of change in, or failure of, a condition to which the safety valve holding means is responsive.

Referring now to Fig. 4 of the drawings, the modified form of the invention shown therein is generally similar to that of Figs. 1-3, the main difference being in the construction of the safety valve which in this instance is provided with a small pilot valve for equalizing the fluid pressure across the safety valve so that the same may readily be moved to open position by the operating means, even when the fluid pressure at the inlet of the valve is relatively high. The plug 114 shown in Fig. 4 is also slightly modified in that it has an integral upper portion 150. In other respects, the means whereby rotation of the plug valve operates the safety valve are substantially identical with those shown and described in connection with Figs. 1-3 and therefore will not further be described. For the sake of clarity, modified members which correspond to those in Figs. 1-3 have in Fig. 4 been assigned numerals which are greater by 100 than those in the other figures.

Threaded in the partition 121 is a seat member 70, cooperable with which is a main safety closure member generally indicated at 123 and comprising an annular member 71 of resilient material mounted in a backing member 72. The spider portion 128 of the inlet bushing 127 is threaded to receive the stem of a generally cup-shaped member 73. Reciprocable in the central bore of this member is a tubular member 74, on an intermediate portion of which the closure backing member 72 is threaded. Also threaded on the member 74, holding the resilient member 71 in position, is a crow's foot 129 which is slidable in the port opening of seat member 70 and thus guides the inner, or left-hand, end of the closure supporting member 70. The closure member 123 is urged toward its seat by a spring 75 compressed between it and the member 73. This spring is so arranged that, when compressed, its turns can nest. The inner end portion 78 of the bore of the member 74 is reduced in diameter to provide a seat for a pilot closure member 76 which is mounted on one end of a rod 77, the other end of this rod carrying a cylindrical guide member 79 slidable in the bore 78 and having a head portion engageable with the inner, or left-hand, end of member 74. The pilot closure member 76 is urged toward its seat by a spring 84 compressed between it and a plug 80 threaded in the outer, or right-hand, end of member 74. Toward its inner end, the member 74 is provided with lateral openings 81.

In the opening movement of the safety valve, the end of arm 132 (corresponding to arm 32 of Figs. 1-3) engages member 79, first moving it inward in the bore 78 to open the pilot closure member 76, whereupon fluid can pass from the inlet 112 around the open inner end of the cup-shaped member 73, through openings 82 provided in the wall of member 74 ahead of the pilot valve, through the bore of member 74, and thence through openings 81 into the chamber 83 at the outlet side of the partition 121. The fluid pressure on either side of the closure member 123 is thus equalized, permitting continued movement of the safety valve operating arm 132 to readily open the closure member 123 by the engagement of the head of member 79 with the end of member 74. It will be understood that the force of the pilot valve spring 84 is considerably weaker than that of spring 75. In its open position, closure member 123 is protected by the cup-shaped member 73 from fluid passing through the valve, the force of which might tend to close it.

While I have herein shown and described specific embodiments of my invention, I wish it to be understood that modifications may be made without departing from the spirit of the invention and that I intend therefore to be limited only by the scope of the appended claims.

I claim as my invention:

1. In a reset valve structure: a valve casing providing a valve socket, a plug having a portion rotatable in said socket for controlling fluid communication in said casing, a safety valve also in said casing for controlling fluid flow therethrough and including a closure member reciprocable in a plane at right angles to the axis of said plug and biased to closed position, an arm for operating said closure member, a stem journaled in said casing and to which said arm is secured, said stem being parallel to the axis of said plug and having a portion extending exteriorly of the casing, a lever secured to the extended portion of said stem, an armature carried by the free end of said lever, electromagnetic means cooperable with said armature and engageable thereby when said arm is in valve-opening position, said electromagnet when energized being effective to hold said armature and thereby retain said closure member in open position, means exterior of the casing for rotating said plug, and means operated by the rotation of said last-named means while the plug is in closed position for actuating said lever.

2. In a reset valve structure: a valve casing providing a valve socket, a plug rotatable in said socket for controlling fluid communication in said casing, manually operable means extending exteriorly of said casing for rotating said plug and having limited freedom of rotation with respect thereto, a safety valve also in said casing for controlling fluid flow therethrough and including a closure member reciprocable in a plane at right angles to the axis of said plug and biased to closed position, an arm for operating said closure member, a stem journaled in said casing and to which said arm is secured, said stem being parallel to the axis of the plug and having a portion extending exteriorly of the casing, a lever secured to the extended portion of said stem, an armature carried by the free end of said lever, electromagnetic means cooperable with said armature and engageable thereby when said arm is in valve-opening position, said electromagnet when energized being effective to hold said armature and thereby retain said closure member in said open position, and means operated by the rotation of said manual operating means while the plug is in closed position for actuating said lever, the freedom of movement between the plug and the operating means being such that upon deenergization of the electromagnet the lever can return to its unactuated position under the influence of said bias without causing rotation of the plug.

3. In a reset valve structure: a valve casing providing a valve socket, a plug having a portion rotatable in said socket for controlling fluid communication in said casing, a safety valve also in said casing for controlling fluid flow therethrough and including a reciprocable closure member biased to closed position, an arm for operating said closure member, a stem journaled in said casing and to which said arm is secured, said stem having a portion extending exteriorly of the casing, a lever secured to said extended portion, an armature carried by the free end of said lever, an electromagnet cooperable with said armature and engageable thereby when said arm is in valve-opening position, said electromagnet when energized being effective to hold said armature and thereby retain said closure member in open position, and means whereby rotation of said plug while it is in closed position effects rotation of said stem.

4. In a reset valve structure: a valve casing providing a valve socket, a plug having a portion rotatable in said socket for controlling fluid communication in said casing, a safety valve also in said casing for controlling fluid flow therethrough and including a closure member reciprocable in a plane substantially at right angles to the axis of said plug and biased to closed position, an arm for operating said closure member, a stem journaled in said casing and to which said arm is secured, said stem having a portion extending exteriorly of the casing, a lever secured to said extended portion, an armature carried by the free end of said lever, an electromagnet cooperable with said armature and engageable thereby when said arm is in valve-opening position, said electromagnet when energized being effective to hold said armature and thereby retain said closure member in open position, means exterior of the casing for rotating said plug, and means operated by the rotation of said last-named means while the plug is in closed position for actuating said lever.

WILLIAM A. RAY.